US011929551B2

(12) United States Patent
Tsai et al.

(10) Patent No.: US 11,929,551 B2
(45) Date of Patent: Mar. 12, 2024

(54) METHOD OF MANUFACTURING CHIP ANTENNA AND A STRUCTURE OF THE CHIP ANTENNA

(71) Applicant: POWER WAVE ELECTRONIC CO., LTD., Taipei (TW)

(72) Inventors: Yun-Chan Tsai, Taipei (TW); Shi-Hong Yang, Taipei (TW)

(73) Assignee: POWER WAVE ELECTRONIC CO., LTD., Taipei (TW)

( * ) Notice: Subject to any disclaimer, the term of this patent is extended or adjusted under 35 U.S.C. 154(b) by 100 days.

(21) Appl. No.: 17/690,497

(22) Filed: Mar. 9, 2022

(65) Prior Publication Data

US 2022/0294103 A1 Sep. 15, 2022

(30) Foreign Application Priority Data

Mar. 10, 2021 (TW) ................................ 110108546

(51) Int. Cl.
*H01Q 1/38* (2006.01)
*H01Q 23/00* (2006.01)

(52) U.S. Cl.
CPC ............... *H01Q 1/38* (2013.01); *H01Q 23/00* (2013.01)

(58) Field of Classification Search
CPC ........ H01Q 1/38; H01Q 23/00; H01Q 1/2283; H05K 3/00; H05K 3/06; H05K 3/10; H05K 3/241; H01L 2223/6677; H01L 23/66; H01L 23/5389
See application file for complete search history.

(56) References Cited

U.S. PATENT DOCUMENTS 9,331,030 B1 * 5/2016 Tsai ........................ H01L 24/20
2018/0331417 A1 * 11/2018 Liao ........................ H05K 3/42

FOREIGN PATENT DOCUMENTS

TW M350952 U 2/2009
TW 201721966 A 6/2017

OTHER PUBLICATIONS

Office Action dated Oct. 14, 2021 of the corresponding Taiwan patent application No. 110108546.

* cited by examiner

*Primary Examiner* — David E Lotter
(74) *Attorney, Agent, or Firm* — Chun-Ming Shih; HDLS IPR SERVICES

(57) ABSTRACT

A method of manufacturing chip antenna and a structure of the chip antenna. The method includes the following steps: preparing a substrate, drilling a plurality of rows of external through holes and internal through holes arranged longitudinally, forming fishing grooves at the predetermined distance between every two of the internal through holes arranged longitudinally, electroplating a metal material on the external through holes and the internal through holes, to form a conductive layer. Afterward, a circuit layer is formed on the conductive layer by exposure, development, and etching techniques. An ink is printed on the substrate after the circuit layer finished, and the ink cover parts of the circuit layer and parts of the substrate exposed, to form a solder mask and a recognition pattern layer. Finally, a longitudinal cutting line and a horizontal cutting line are cut on the substrate, and to form a chip antenna.

22 Claims, 12 Drawing Sheets

METHOD OF MANUFACTURING CHIP ANTENNA AND A STRUCTURE OF THE CHIP ANTENNA

BACKGROUND

Technical Field

The present disclosure relates to a chip antenna, and more particularly to a method of manufacturing a chip antenna and a structure of the chip antenna with functions of receiving and transmitting signals.

Description of Related Art

The statements in this section merely provide background information related to the present disclosure and do not necessarily constitute prior art.

With the development of wireless communication technology, electronic products, especially portable electronic devices such as a notebook computer, a mobile phone, and a personal digital assistant (PDA), have all been designed and developed towards more compactness.

The related-art multi-band antenna structure used in electronic devices has a chip antenna and a substrate. The chip antenna is formed of ceramic material into a square substrate, and a radiator is formed on the surface of the substrate by printing technology, lithography, and wet etching technology. When the chip antenna is electrically connected to the substrate, the radiator of the chip antenna is electrically connected to a microstrip on the substrate. After the microstrip is electrically connected to the copper cable and the radiating metal part receives the signal, the signal transmits to the copper cable by the microstrip, and then the signal transmits to the main board of the electronic device for processing by the copper cable, so as to achieve the purpose of communication.

The radiator on the related-art chip antenna is formed by printing technology, lithography, and wet etching technology. Although the volume of the chip antenna is much smaller than the volume of traditional antennas, the stability of manufacturing process of the related-art chip antennas is poor, resulting in an increase in defect rate of the chip antenna. In addition, there is a lot of remaining material after the chip antenna is manufactured, which leads to material waste and increased manufacturing costs.

SUMMARY

Therefore, the purpose of the present disclosure is to provide a method of manufacturing chip antenna and a structure of the chip antenna, which may improve the stability of manufacturing process of the chip antenna, increase the manufacturing yield of the chip antenna, and increase the utilization rate of material.

In order to achieve the purpose, the present disclosure provides a method of manufacturing chip antenna includes the following steps: Preparing a substrate, each having a metal layer on a front surface and a back surface of the substrate. Drilling a plurality of rows of external through holes arranged longitudinally on the substrate at predetermined positions for making chip antennas, and two of internal through holes arranged longitudinally between every two of the external through holes arranged longitudinally, and a predetermined distance between every two of the internal through holes arranged longitudinally. Forming fishing grooves at the predetermined distance between every two of the internal through holes arranged longitudinally. Electroplating a metal material on the metal layer of a front surface and a back surface of the substrate, and on walls of the external through holes and the internal through holes, to form a conductive layer. Performing at least one of exposure, development, and etching techniques to form a circuit layer electrically connected to the metal layer on the front surface and the back surface of the substrate, and connected to the external through holes and the internal through holes, and the circuit layer includes a first side circuit layer, a second side circuit layer, and an internal circuit layer between the first side circuit layer and the second side circuit layer. Printing black ink on the front surface and the back surface of the substrate after the circuit layer finished, and the black ink cover the internal circuit layer between the first side circuit layer and the second side circuit layer to form a solder mask, and only the internal through holes and parts of the internal circuit layer exposed by the solder mask. Printing white ink on the front surface of the substrate exposed between the solder mask and an external circuit after the solder mask finished, to form a recognition pattern layer for recognizing directions or part numbers. Electroplating a metal material on the front surface of the substrate, walls of the internal through holes exposed on the back surface of the substrate, parts of a short line exposed, the first side circuit layer exposed, the walls of the external through holes exposed, and the second side circuit layer exposed, and to form an electrode layer. Cutting a longitudinal cutting line and a horizontal cutting line on the substrate after the electrode layer formed, and to form a chip antenna; the longitudinal cutting line aligned with the external through holes arranged longitudinally, the horizontal cutting line aligned with a gap between the internal through holes arranged horizontally up and down.

In an embodiment of the present disclosure, the substrate is a printed circuit board.

In an embodiment of the present disclosure, three of the internal through holes and two of the external through holes are used to form the chip antenna.

In an embodiment of the present disclosure, the diameters of the internal through holes and the external through holes are both 0.15 mm.

In an embodiment of the present disclosure, a drilling hole for machine alignment and another drilling hole for slot knife alignment are formed on one side of the substrate with the external through holes arranged longitudinally and the internal through holes arranged longitudinally.

In an embodiment of the present disclosure, the conductive layer is formed of metallic copper material.

In an embodiment of the present disclosure, the first side circuit layer is a straight line and extends on the external through holes, the second side circuit layer is a straight line located on the substrate between the internal circuit layer and the fishing grooves, the internal circuit layer consists of a long line and a short line, the long line extends to two of the corresponding internal through holes, the short line extends on one side of the internal through hole.

In an embodiment of the present disclosure, the black ink is formed of insulating material.

In an embodiment of the present disclosure, the recognition pattern layer is texts, numbers, or graphics.

In an embodiment of the present disclosure, the metal material is formed of metallic tin material.

In an embodiment of the present disclosure, after the chip antenna is formed, a frequency modulation element is electrically connected to one of parts of the short line exposed of the internal circuit layer and the first side circuit layer.

In an embodiment of the present disclosure, the frequency modulation element is a capacitor or an inductor.

In order to achieve the purpose, the present disclosure provides a structure of chip antenna includes a substrate, a solder mask, a recognition pattern layer, an electrode layer. The substrate having external through holes, internal through holes, and a circuit layer electrically connected to the external through holes and the internal through holes, and the circuit layer includes a first side circuit layer, a second side circuit layer, and an internal circuit layer between the first side circuit layer and the second side circuit layer. The solder mask is disposed on the front surface and the back surface of the substrate, and configured to cover the internal circuit layer of the circuit layer to form the solder mask, the solder mask partially exposes the internal circuit layer. The recognition pattern layer is disposed on the front surface of the substrate exposed between the solder mask and an external circuit to form the recognition pattern layer for recognizing directions or part numbers. The electrode layer is disposed on walls of the internal through holes which are exposed, parts of a short line which is exposed, the first side circuit layer which is exposed, the walls of the external through holes which are exposed, and the second side circuit layer which is exposed, to form the electrode layer of the chip antenna.

In an embodiment of the present disclosure, the first side circuit layer is a straight line and extends on the external through holes, the second side circuit layer is a straight line located on the substrate between the internal circuit layer and the fishing grooves, the internal circuit layer consists of a long line and a short line, the long line extends to two of the corresponding internal through holes, the short line extends on one side of the internal through hole.

In an embodiment of the present disclosure, the solder mask exposes the internal through holes of the internal circuit layer and one end of parts of the short line.

In an embodiment of the present disclosure, the solder mask is formed of the black ink.

In an embodiment of the present disclosure, the black ink is formed of insulating material.

In an embodiment of the present disclosure, the substrate is a printed circuit board.

In an embodiment of the present disclosure, the recognition pattern layer is formed of white ink.

In an embodiment of the present disclosure, the recognition pattern layer is texts, numbers, or graphics.

In an embodiment of the present disclosure, a frequency modulation element is electrically connected to one end of parts of the short line exposed of the internal circuit layer and the first side circuit layer.

In an embodiment of the present disclosure, the frequency modulation element is a capacitor or an inductor.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

The technical content and detailed description of the present disclosure are now described with the drawings as follows.

Figure 1:
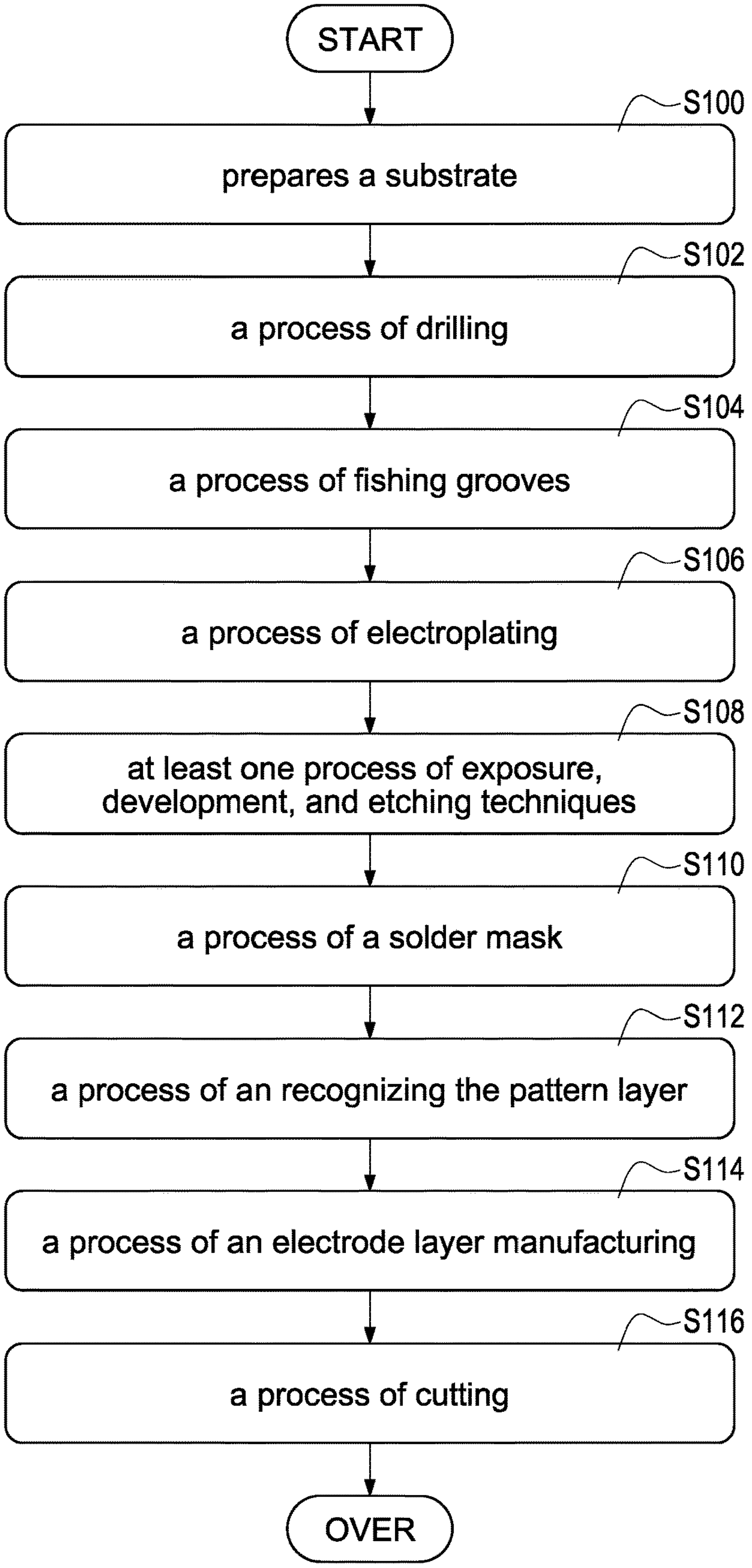
FIG. 1 is a flowchart of a method of manufacturing a chip antenna of the present disclosure.
Figure 2:
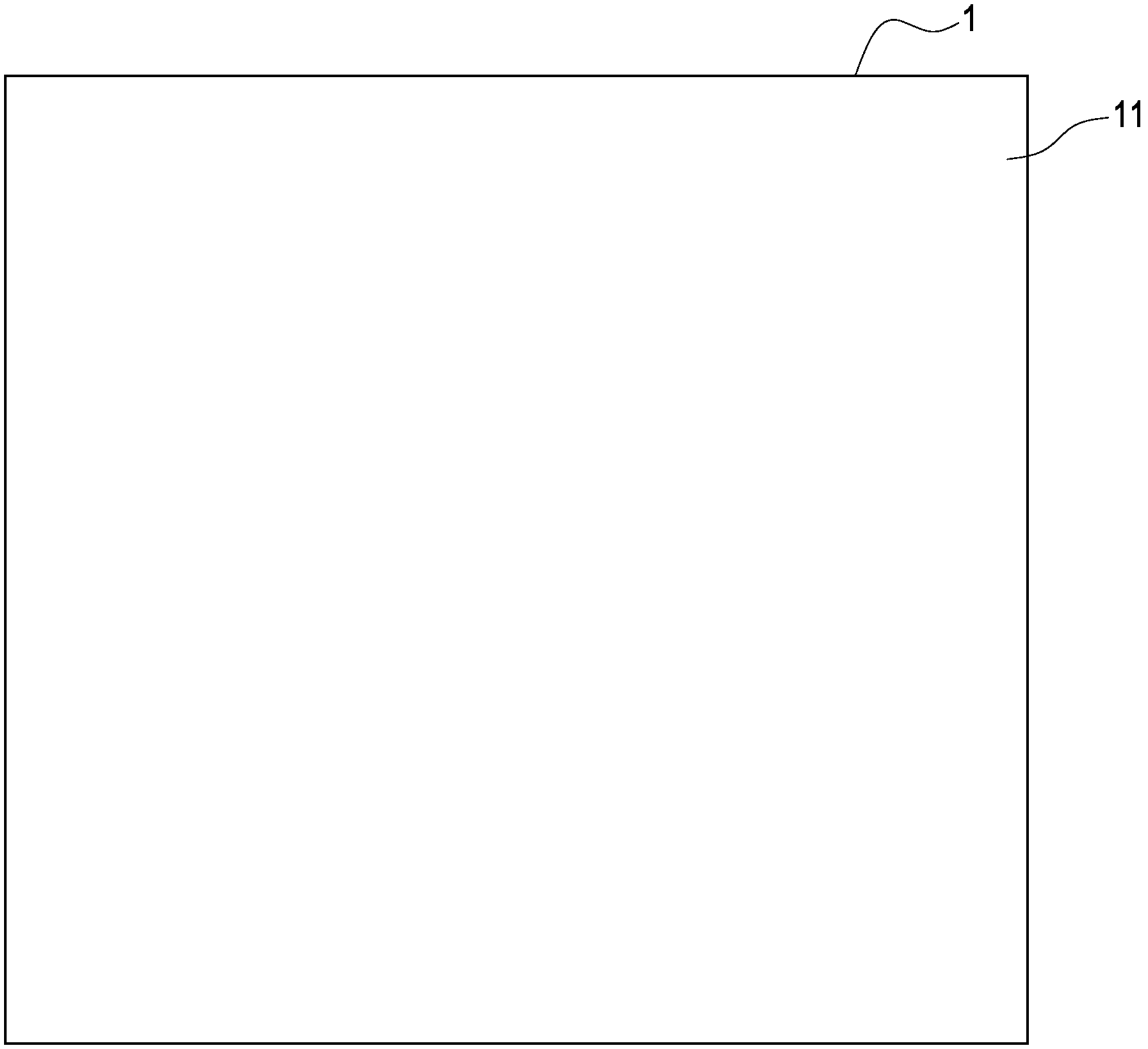
FIG. 2 is a schematic front view of a substrate of the present disclosure.

Please refer to FIG. 1, which is a flowchart of a method of manufacturing a chip antenna of the present disclosure, and schematic structure diagrams FIGS. 2-11 are corresponding to steps of FIG. 1. Please also refer to FIGS. 2-11. As shown in the figures, the method of manufacturing the chip antenna of the present disclosure, as in step S100, first prepares a substrate 1 with a front surface and a back surface, and a metal layer 11 is on both the front surface and the back surface of the substrate 1, as shown in the FIG. 2. The substrate 1 is a printed circuit board (PCB).

Step S102 is a process of drilling. A processing machine (not shown) is used to drill a plurality of rows of external through holes 12 arranged longitudinally on the substrate 1 at predetermined positions for manufacturing chip antennas 10 (as shown in the FIGS. 9 and 10). Every two of internal through holes 13 are arranged longitudinally between every two of the external through holes 12 arranged longitudinally, and a predetermined distance 102 is between every two of the internal through holes 13 arranged longitudinally.

Figure 3:
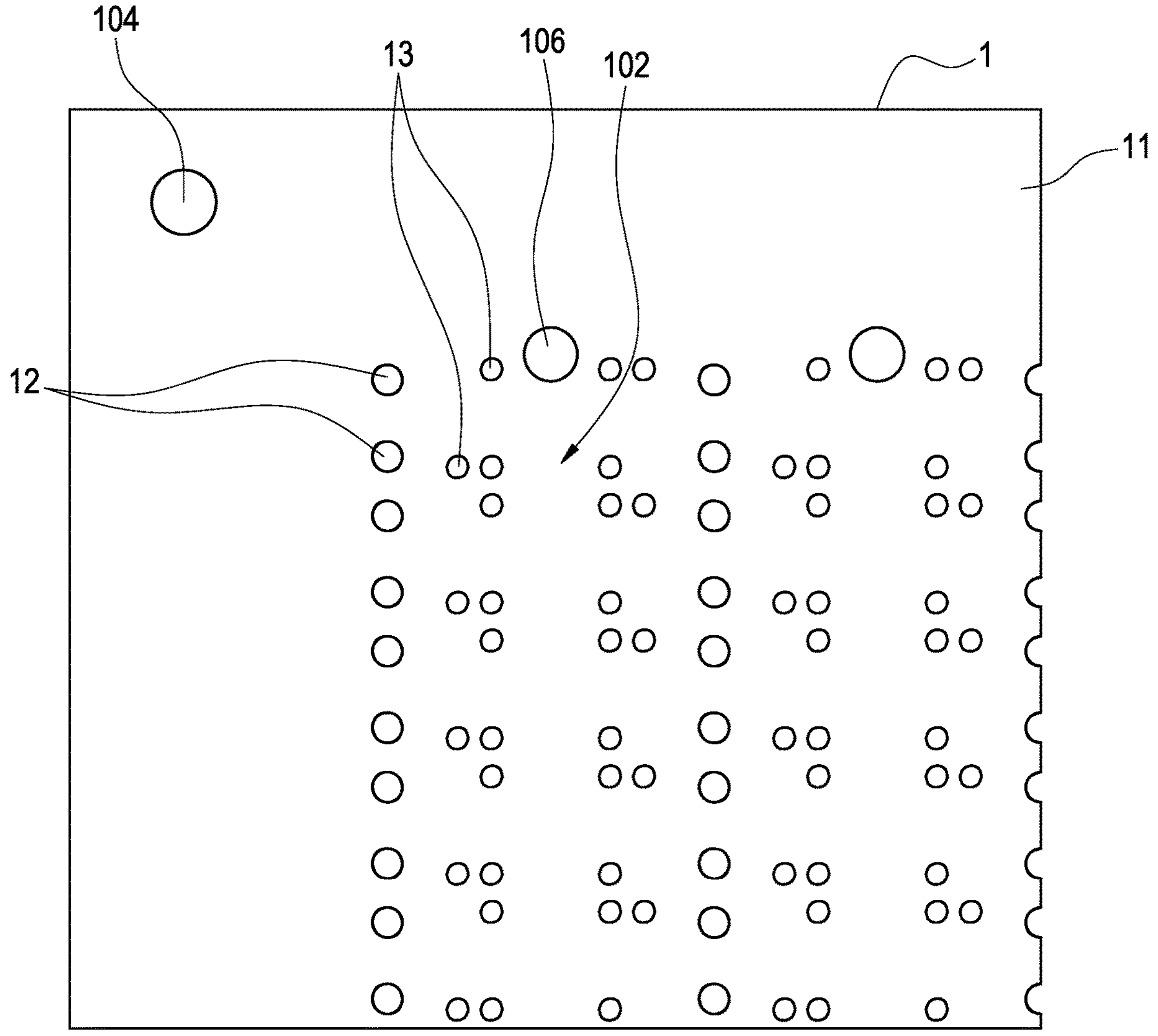
FIG. 3 is a schematic structure diagram made by drilling holes on the substrate in FIG. 2.

In addition, a drilling hole for machine alignment 104 and a drilling hole for slot knife alignment 106 are formed on one side of the substrate 1 with the external through holes 12 arranged longitudinally and the internal through holes 13 arranged longitudinally, as shown in the FIG. 3. Three of the internal through holes 13 and two of the external through holes 12 are used to form the chip antenna 10. The diameters of the internal through holes 13 and the external through holes 12 are both 0.15 mm.

Figure 4:
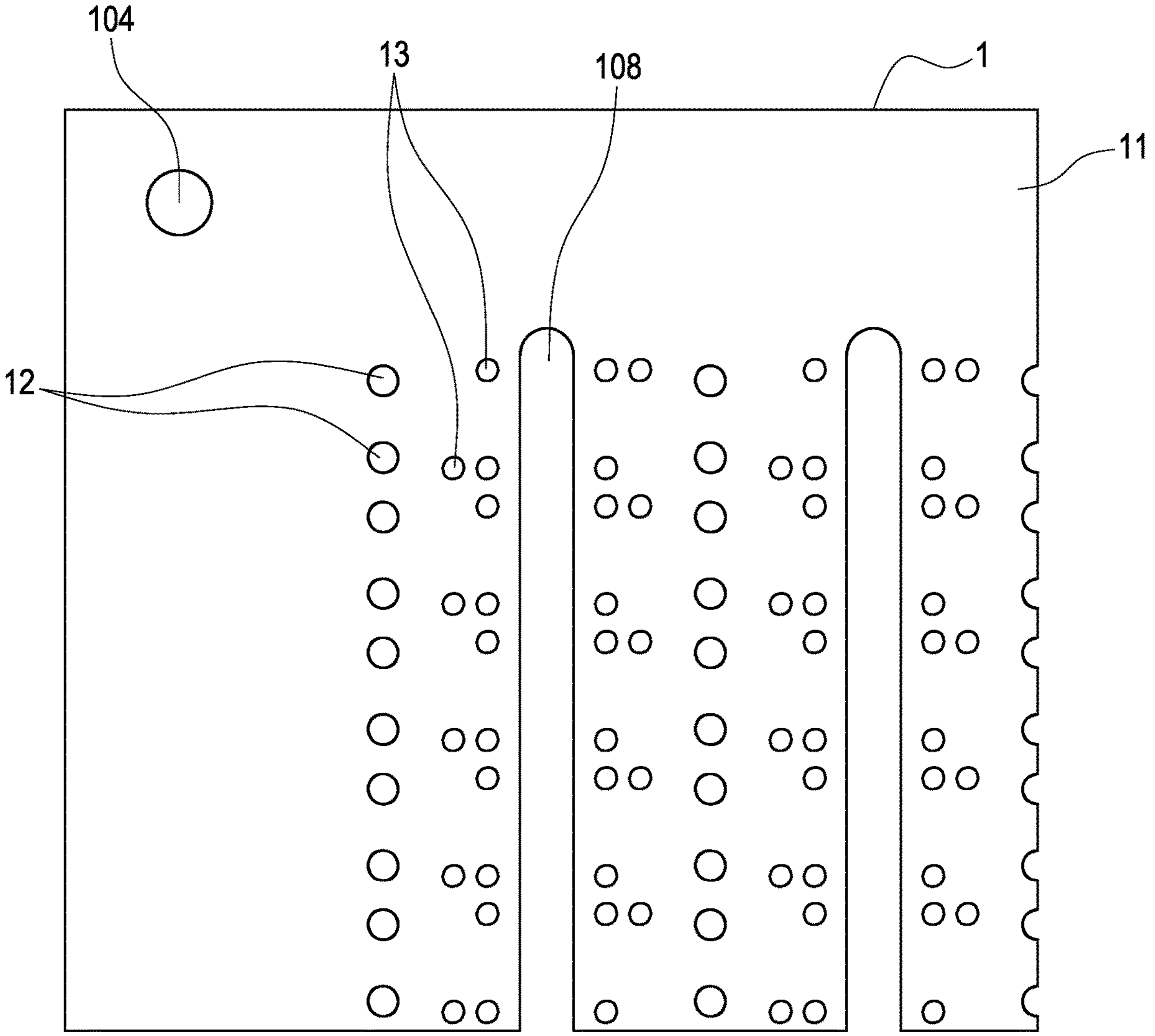
FIG. 4 is a schematic structure diagram of made by fishing grooves on the substrate in FIG. 3.

Step S104 is a process of fishing grooves. After the external through holes 12, the internal through holes 13, the drilling hole for machine alignment 104, and the drilling hole for slot knife alignment 106 are completed, a fishing groove processing tool (not shown) performs fishing grooves 108 at the predetermined distance 102 between every two of the internal through holes 13 arranged longitudinally, as shown in FIG. 4.

Figure 5:
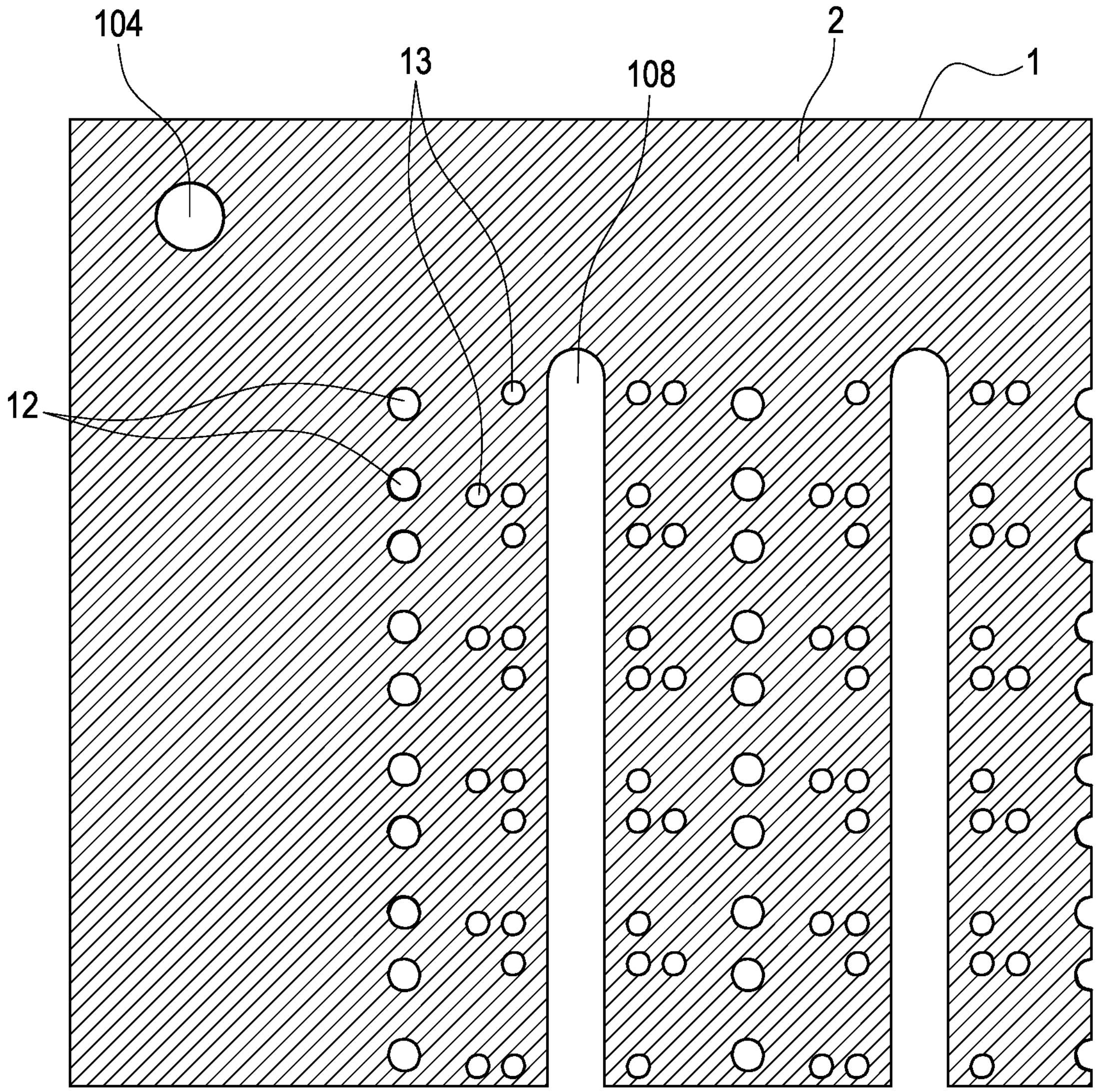
FIG. 5 is a schematic front view of the structure made of an electroplated conductive layer in FIG. 4.
Figure 6:
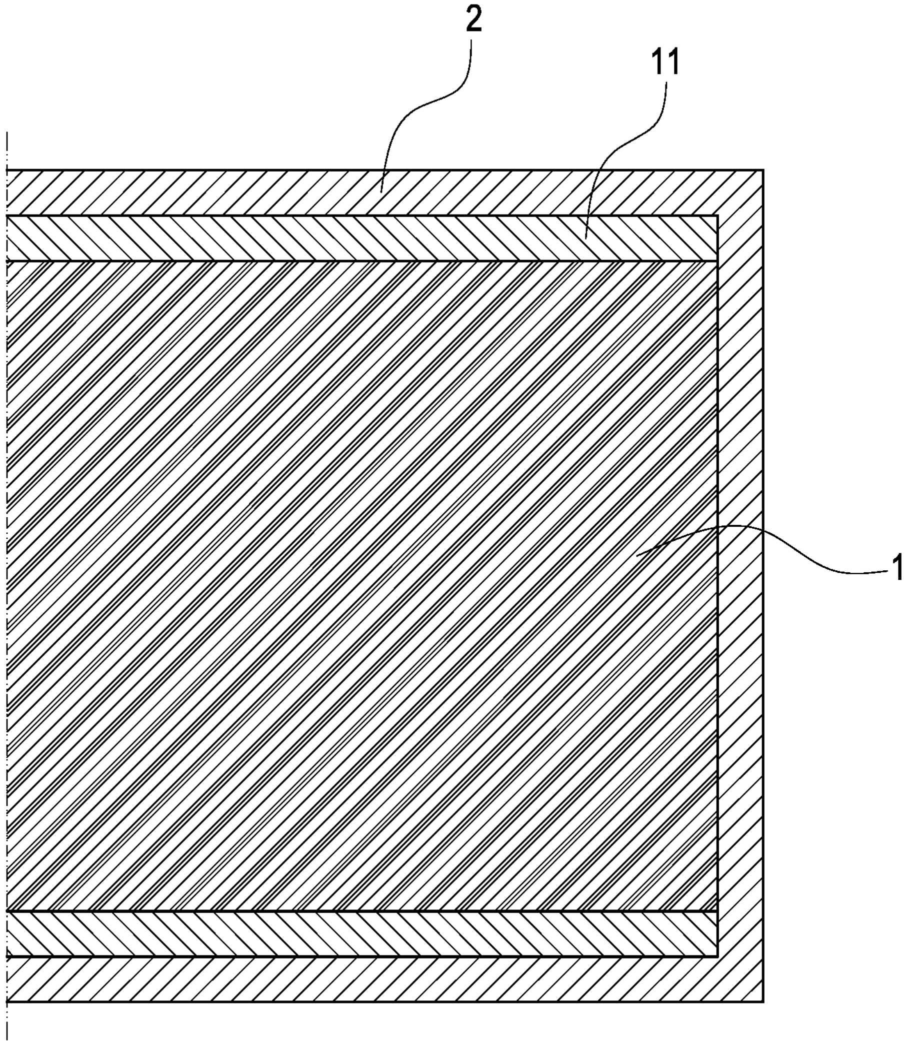
FIG. 6 is a schematic side sectional view of the structure made of the electroplated conductive layer in FIG. 5.

Step S106 is a process of electroplating. A metallic copper material is electroplated on the metal layer 11 of the front surface and the back surface of the substrate 1, and a conductive layer 2 is formed on walls of the external through holes 12 and walls of the internal through holes 13, as shown in FIGS. 5 and 6.

Figure 7:
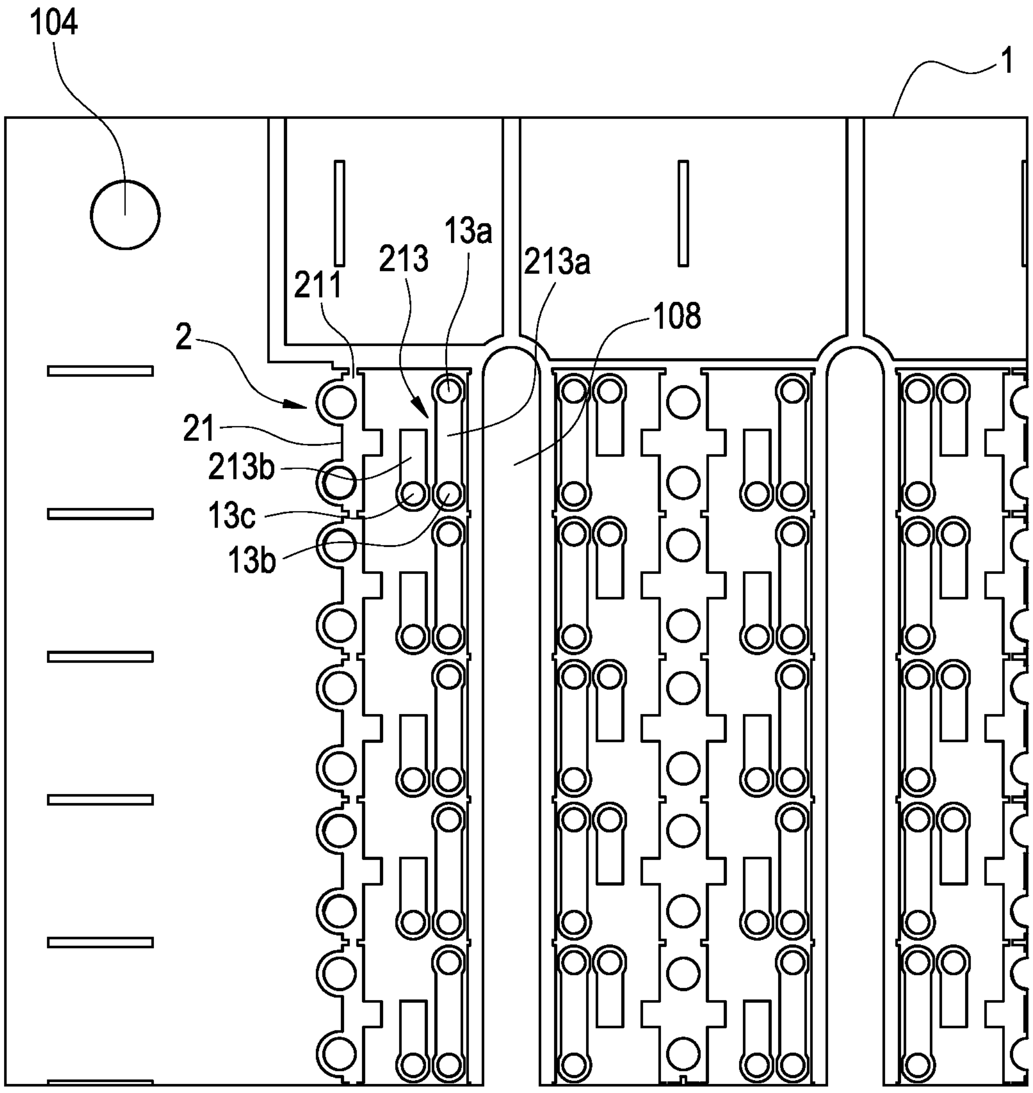
FIG. 7 is a schematic diagram of the structure made by exposure, development, and etching in FIG. 5.

Step S108 is at least one process of exposure, development, and etching techniques. Wet chemical etching or dry laser direct imaging (LDI) technology is used to form a circuit layer 21 electrically connected to the metal layer 11 on the front surface and the back surface of the substrate 1, and connected to the external through holes 12 and the internal through holes 13. The circuit layer (radiation layer) 21 includes a first side circuit layer 211, a second side circuit layer 212, and an internal circuit layer 213 between the first side circuit layer 211 and the second side circuit layer 212. The first side circuit layer 211 is a straight line and extends on the external through holes 12, the second side circuit layer 212 is a straight line located on the substrate between the internal circuit layer 213 and the fishing grooves 108. The internal circuit layer 213 consists of a long line 213*a* and a short line 213*b*, the long line 213*a* extends to two of the corresponding internal through holes 13*a*, 13*b*, and the short line 213*b* extends on one side of the internal through hole 13*c*, as shown in FIG. 7.

Figure 8:
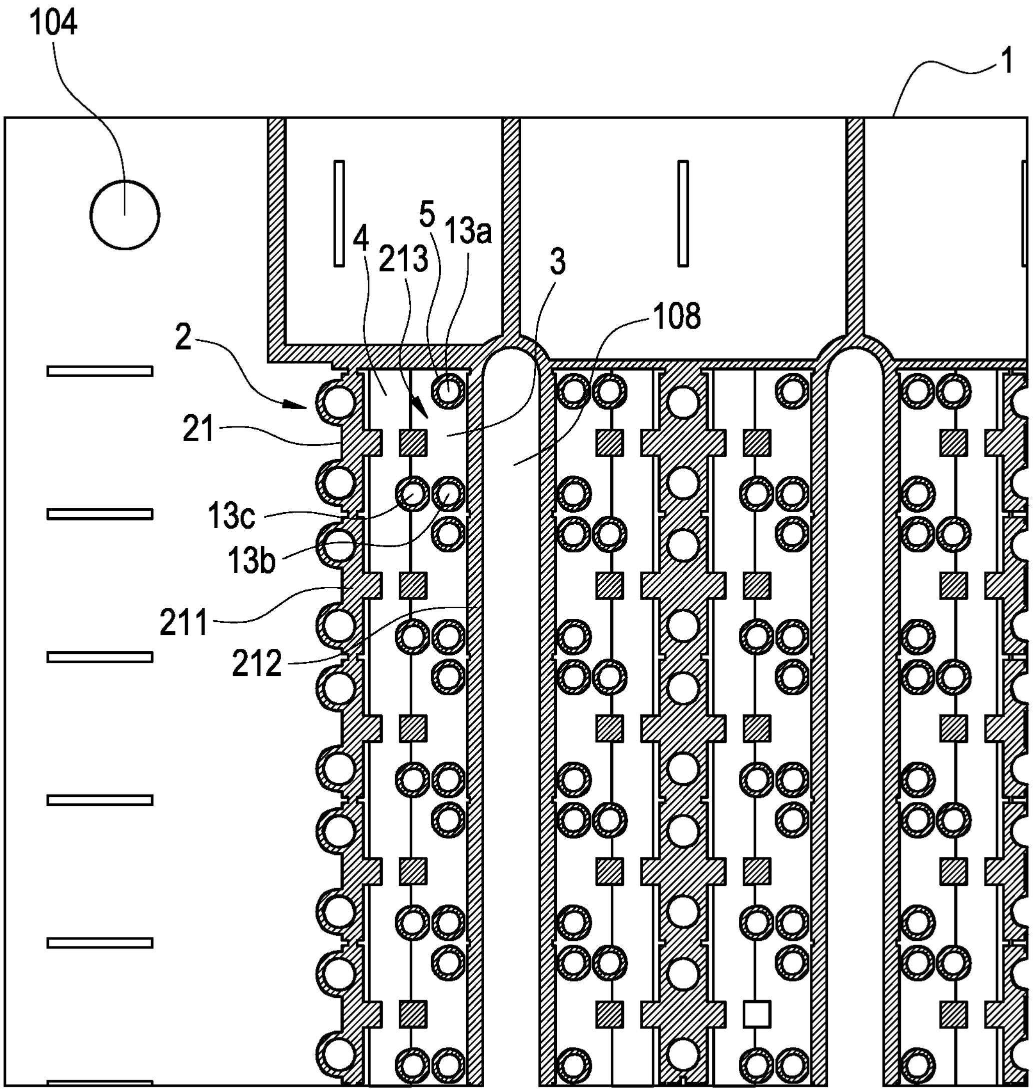
FIG. 8 is a schematic diagram of the structure made by solder mask, text ink layer, and electrode layer in FIG. 7.

Step S110 is a process of a solder mask. After the circuit layer 21 is finished, Printing technology is used to print black ink on the front surface and the back surface of the substrate 1, and the black ink covers the internal circuit layer 213 between the first side circuit layer 211 and the second side circuit layer 212 to form a solder mask 3 as shown in FIG. 8, where only the internal through holes 13*a*, 13*b*, and 13*c*, and parts of the internal circuit layer 213*b* are exposed by the solder mask 3. The black ink is formed of insulating material.

Step S112 is a process of an recognizing the pattern layer. After the solder mask 3 is formed, Printing technology is used to print white ink on the front surface of the substrate 1 exposed between the solder mask 3 and an external circuit after the solder mask 3 is finished, to form a recognition pattern layer 4 (as shown in FIG. 8) for recognizing directions or part numbers. The recognition pattern layer 4 is texts, numbers, or graphics.

Step S114 is a process of an electrode layer manufacturing. After the solder mask 3 and the recognition pattern layer 4 are manufactured, a metallic tin material is electroplated on the front surface of the substrate 1, walls of the internal through holes 13*a*, 13*b*, and 13*c* exposed on the back surface of the substrate 1, parts of the exposed short line 213*b*, the exposed first side circuit layer 211, the walls of the external through holes 12 exposed, and the exposed second side circuit layer 212, and to form an electrode layer 5 for soldering the chip antenna 10 (as shown in FIG. 8).

Figure 9:
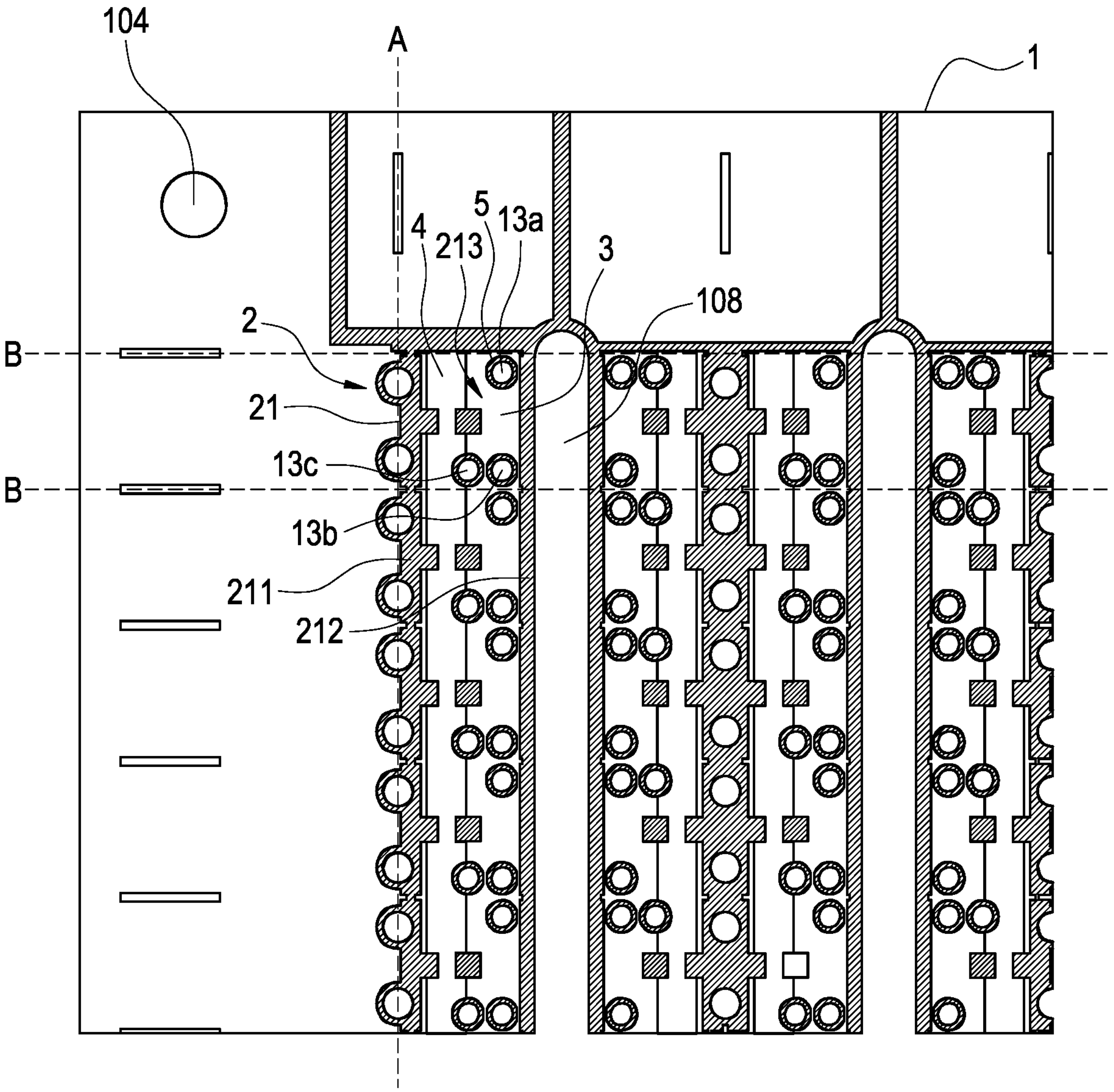
FIG. 9 is a schematic diagram of cutting the completed chip antenna on the substrate in FIG. 8.
Figure 10:
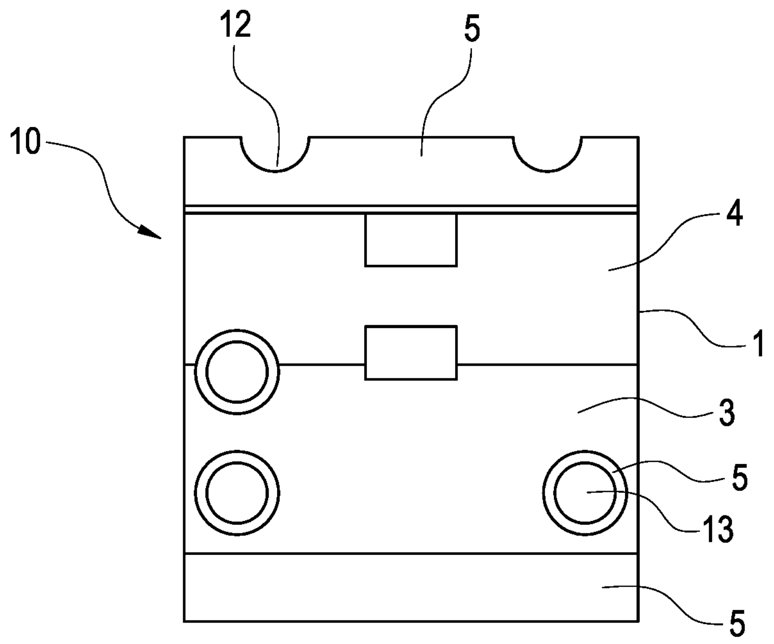
FIG. 10 is a schematic structure diagram of the single chip antenna cut in FIG. 9.

Step S116 is a process of cutting. After the electrode layer 5 is formed, a longitudinal cutting line A and a horizontal cutting line B are cut on the substrate 1, the longitudinal cutting line A being aligned with the external through holes 12 arranged longitudinally, the horizontal cutting line B being aligned with a gap between the internal through holes 13 arranged horizontally up and down, and to form the chip antenna 10 (as shown in FIG. 9).

Please refer to FIGS. 2-11, which are schematic diagrams of the structures generated in each step of the present disclosure. As shown in the figures, the chip antenna 10 includes the substrate 1, the solder mask 3, the recognition pattern layer 4, and the electrode layer 5.

For the substrate 1, the circuit layer 21 electrically connected to the metal layer 11 is formed on the front surface and the back surface of the substrate 1, and connected to the external through holes 12 and the internal through holes 13.

The circuit layer (radiation layer) 21 includes the first side circuit layer 211, the second side circuit layer 212, and an internal circuit layer 213 between the first side circuit layer 211 and the second side circuit layer 212. The first side circuit layer 211 is the straight line and extending on the external through holes 12, the second side circuit layer 212 is the straight line located on the substrate between the internal circuit layer 213 and the fishing grooves 108. The internal circuit layer 213 consists of the long line 213*a* and the short line 213*b*, the long line 213*a* extends to two of the corresponding internal through holes 13*a*, 13*b*, and the short line 213*b* extends on one side of the internal through hole 13*c*. The substrate 1 is a PCB.

For the solder mask 3, printing technology is used to print black ink on the front surface and the back surface of the substrate 1, and the black ink covers the internal circuit layer 213 to form the solder mask 3, and only the internal through holes 13*a*, 13*b*, and 13*c*, and parts of the internal circuit layer 213*b* exposed by the solder mask 3. The black ink is formed of insulating material.

About the recognition pattern layer 4, printing technology is used to print white ink on the front surface of the substrate 1 exposed between the solder mask 3 and an external circuit after the solder mask 3 finished, to form the recognition pattern layer 4 for recognizing directions or part numbers. The recognition pattern layer 4 is texts, numbers, or graphics.

About the electrode layer 5, a metallic tin material is electroplated on the front surface of the substrate 1, walls of the internal through holes 13*a*, 13*b*, and 13*c* exposed on the back surface of the substrate 1, parts of the exposed short line 213*b*, the exposed first side circuit layer 211, the walls of the exposed external through holes 12, and the second side circuit layer 212 exposed, and to form the electrode layer 5 for soldering the chip antenna 10.

Figure 11:
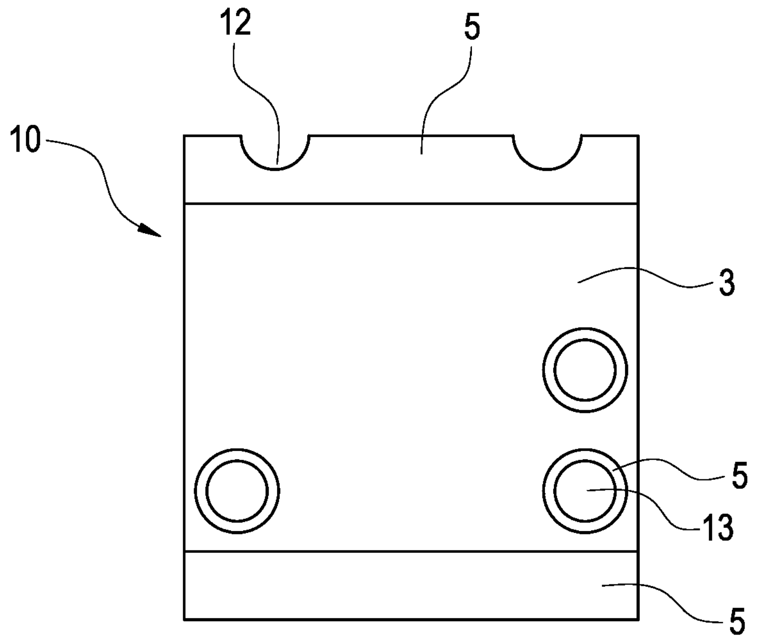
FIG. 11 is a schematic diagram of the back surface structure of the chip antenna in FIG. 10.
Figure 12:
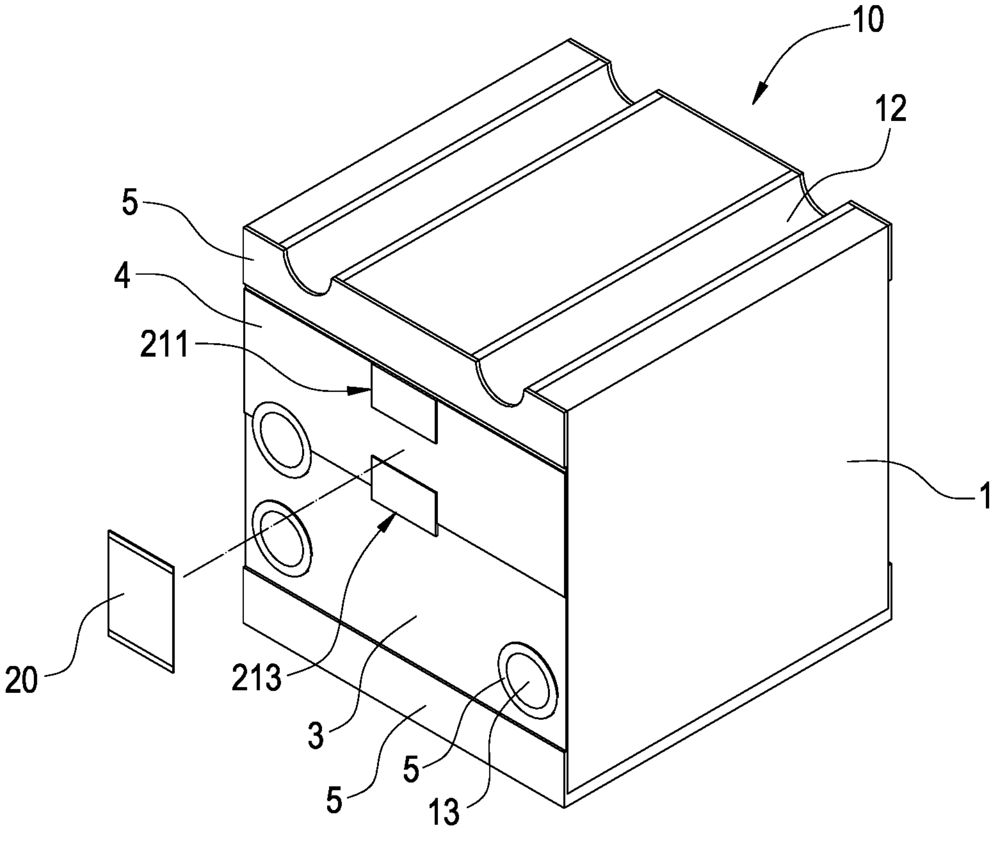
FIG. 12 is a schematic diagram of the structure of a frequency modulation element welded to the single chip antenna in FIG. 11.

Please refer to the FIG. 12, which is a schematic diagram of the structure of a frequency modulation element welded to single of the chip antenna in FIG. 11. After the chip antenna 10 is formed, a frequency modulation element 20 is electrically connected to one of parts of the short line 213*b* exposed of the internal circuit layer 213 and the first side circuit layer 211. The frequency modulation element 20 is a capacitor or an inductor.

Figure 13:
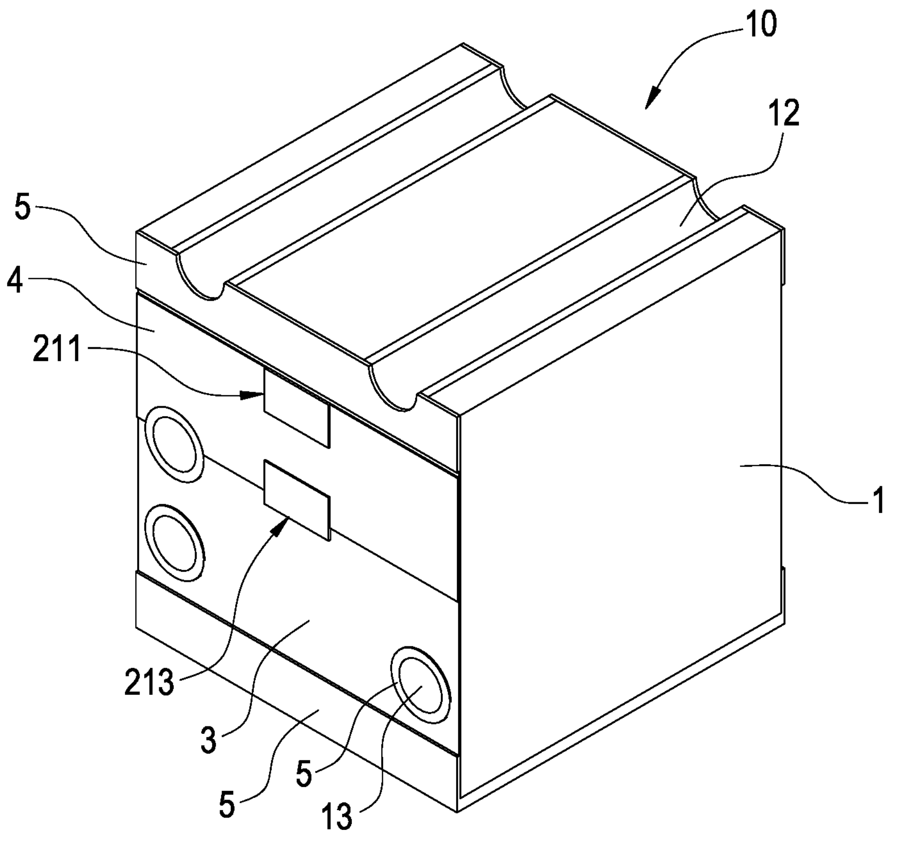
FIG. 13 is a schematic diagram of another embodiment of the chip antenna of the present disclosure.

Please refer to the FIG. 13, which is a schematic diagram of another embodiment of the chip antenna of the present disclosure. During the process of printing black/white ink, only parts of the first side circuit layer 211 is exposed, and one end of the short line 213*b* of the internal circuit layer 213 is not exposed. The working frequency of the chip antenna 10 already meets the requirements, so there is no need to reconnect the frequency modulation element 20, and no need to adjust the working frequency. For this reason, the fabrication of the chip antenna 10 is easier and simpler.

The technical contents are only some embodiments of the present disclosure, and is not used to limit the scope of the present disclosure. Any modification of the structure, the change of the proportional relationship, or the adjustment of the size, should be within the scope of the technical contents disclosed by the present disclosure without affecting the effects and the achievable effects of the present disclosure.

While this disclosure has been described by means of specific embodiments, numerous modifications and variations could be made thereto by those skilled in the art without departing from the scope and spirit of this disclosure set forth in the claims.

What is claimed is:

1. A method of manufacturing a chip antenna, the method comprising steps of:

(a) preparing a substrate with a front surface and a back surface, a metal layer on both the front surface and the back surface, (b) drilling a plurality of rows of external through holes arranged longitudinally on the substrate at predetermined positions for making chip antennas, and every two of internal through holes arranged longitudinally between every two of the external through holes arranged longitudinally, wherein a predetermined distance is between every two of the internal through holes arranged longitudinally, (c) forming fishing grooves at the predetermined distance between every two of the internal through holes arranged longitudinally, (d) electroplating a metal material on the metal layer of the front surface and the back surface of the substrate, and on walls of the external through holes and the internal through holes, to form a conductive layer, (e) performing at least one of exposure, development, and etching techniques to form a circuit layer electrically connected to the metal layer on the front surface and the back surface of the substrate, and connected to the external through holes and the internal through holes, the circuit layer comprising a first side circuit layer, a second side circuit layer, and an internal circuit layer between the first side circuit layer and the second side circuit layer, (f) printing black ink on the front surface and the back surface of the substrate after the circuit layer is finished, the black ink covering the internal circuit layer between the first side circuit layer and the second side circuit layer to form a solder mask, wherein only the internal through holes and parts of the internal circuit layer are exposed by the solder mask, (g) printing white ink on the front surface of the substrate exposed between the solder mask and an external circuit after the solder mask finished, to form a recognition pattern layer for recognizing directions or part numbers, (h) electroplating a metal material on the front surface of the substrate, walls of the internal through holes exposed on the back surface of the substrate, a short line of the parts of internal circuit layer exposed on the back surface of the substrate, the first side circuit layer exposed on the back surface of the substrate, the walls of the external through holes exposed on the back surface of the substrate, and the second side circuit layer exposed on the back surface of the substrate, and to form an electrode layer, and (i) cutting a longitudinal cutting line and a horizontal cutting line on the substrate after the electrode layer formed, and to form a chip antenna; the longitudinal cutting line aligned with the external through holes arranged longitudinally, the horizontal cutting line aligned with a gap between the internal through holes arranged horizontally up and down.

2. The method of manufacturing chip antenna as claimed in claim 1, wherein, in the step (a), the substrate is a printed circuit board.

3. The method of manufacturing chip antenna as claimed in claim 1, wherein, in the step (b), three of the internal through holes and two of the external through holes are used to form the chip antenna.

4. The method of manufacturing chip antenna as claimed in claim 1, wherein, in the step (b), the diameters of the internal through holes and the external through holes are both 0.15 mm.

5. The method of manufacturing chip antenna as claimed in claim 1, wherein, in the step (b), a drilling hole for machine alignment and a drilling hole for slot knife alignment are formed on one side of the substrate with the external through holes arranged longitudinally and the internal through holes arranged longitudinally.

6. The method of manufacturing chip antenna as claimed in claim 1, wherein, in the step (d), the conductive layer is formed of metallic copper material.

7. The method of manufacturing chip antenna as claimed in claim 1, wherein, in the step (e), the first side circuit layer is a straight line and extends on the external through holes, the second side circuit layer is a straight line located on the substrate between the internal circuit layer and the fishing grooves, the internal circuit layer consists of a long line and the short line, the long line extends to two of the corresponding internal through holes, the short line extends on one side of the internal through hole.

8. The method of manufacturing chip antenna as claimed in claim 1, wherein, in the step (f), the black ink is formed of insulating material.

9. The method of manufacturing chip antenna as claimed in claim 1, wherein, in the step (g), the recognition pattern layer is texts, numbers, or graphics.

10. The method of manufacturing chip antenna as claimed in claim 1, wherein, in the step (h), the metal material is formed of metallic tin material.

11. The method of manufacturing chip antenna as claimed in claim 7, further comprising, after the chip antenna is formed, electrically connecting a frequency modulation element to one of parts of the short line exposed of the internal circuit layer and the first side circuit layer.

12. The method of manufacturing chip antenna as claimed in claim 11, wherein, the frequency modulation element is a capacitor or an inductor.

13. A structure of a chip antenna comprising:

a substrate having external through holes, internal through holes, and a circuit layer electrically connected to the external through holes and the internal through holes, and the circuit layer comprising a first side circuit layer, a second side circuit layer, and an internal circuit layer between the first side circuit layer and the second side circuit layer, a solder mask disposed on a front surface and a back surface of the substrate, and configured to cover the internal circuit layer of the circuit layer to form the solder mask, the solder mask partially exposes the internal circuit layer, a recognition pattern layer disposed on the front surface of the substrate exposed between the solder mask and an external circuit to form the recognition pattern layer for recognizing directions or part numbers, an electrode layer disposed on walls of the internal through holes which are exposed, parts of a short line which is exposed, the first side circuit layer which is exposed, the walls of the external through holes which are exposed, and the second side circuit layer which is exposed, to form the electrode layer of the chip antenna.

14. The structure of the chip antenna as claimed in claim 13, wherein, the first side circuit layer is a straight line and extends on the external through holes, the second side circuit layer is a straight line located on the substrate between the internal circuit layer and the fishing grooves, the internal circuit layer consists of a long line and a short line, the long line extends to two of the corresponding internal through holes, the short line extends on one side of the internal through hole.

15. The structure of the chip antenna as claimed in claim 14, wherein, the solder mask exposes the internal through holes of the internal circuit layer and one end of parts of the short line.

16. The structure of the chip antenna as claimed in claim 13, wherein, the solder mask is formed of the black ink.

17. The structure of the chip antenna as claimed in claim 13, wherein, the black ink is formed of insulating material.

18. The structure of the chip antenna as claimed in claim 13, wherein, the substrate is a printed circuit board.

19. The structure of the chip antenna as claimed in claim 13, wherein, the recognition pattern layer is formed of white ink.

20. The structure of the chip antenna as claimed in claim 13, wherein, the recognition pattern layer is texts, numbers, or graphics.

21. The structure of the chip antenna as claimed in claim 14, wherein, a frequency modulation element is electrically connected to one end of parts of the short line exposed of the internal circuit layer and the first side circuit layer.

22. The structure of the chip antenna as claimed in claim 21, wherein, the frequency modulation element is a capacitor or an inductor.

* * * * *